United States Patent [19]

Cunningham et al.

[11] Patent Number: 5,362,362
[45] Date of Patent: Nov. 8, 1994

[54] METHODS OF DEINKING CELLULOSIC MATERIALS

[75] Inventors: H. Wilson Cunningham, Fairfax; Allen M. Cooley, Vienna; Harshad D. Matalia, Herndon, all of Va.

[73] Assignee: Newspaper Association of America, Reston, Va.

[21] Appl. No.: 905,392

[22] Filed: Jun. 29, 1992

[51] Int. Cl.$^5$ .................................................. D21C 5/02
[52] U.S. Cl. .......................................... 162/5; 162/6; 162/8; 162/78
[58] Field of Search ............................ 162/5, 6, 8, 78

[56] References Cited

U.S. PATENT DOCUMENTS

| | | | |
|---|---|---|---|
| 1,933,227 | 10/1933 | Snyder et al. | 162/5 |
| 2,112,562 | 3/1938 | Fisher | 162/5 |
| 2,703,754 | 3/1955 | Myers | 162/6 |
| 3,051,609 | 8/1962 | Grossman | 162/5 |
| 3,072,521 | 1/1963 | Samuelson et al. | 162/5 |
| 3,226,343 | 12/1965 | Rhodes | 260/2.3 |
| 3,595,741 | 3/1970 | Goss | 162/5 |
| 3,635,789 | 1/1972 | Green, Jr. | 162/5 |
| 3,766,001 | 10/1973 | Gleason et al. | 162/8 |
| 3,865,686 | 2/1975 | Jursich et al. | 162/168 |
| 3,891,497 | 6/1975 | Daane et al. | 162/6 |
| 3,994,770 | 11/1976 | Lausch | 162/6 |
| 4,916,178 | 4/1990 | Amati et al. | 524/401 |

FOREIGN PATENT DOCUMENTS 58-76471  5/1983  Japan .

*Primary Examiner*—Peter Chin
*Attorney, Agent, or Firm*—Burns, Doane, Swecker & Mathis

[57] ABSTRACT

Disclosed is a method of deinking cellulosic materials comprising, shredding or chopping the cellulosic materials to create uniform paper shreds, immersing the paper shreds into a nonaqueous organic solvent while agitating the paper shreds, removing the organic solvent, bleaching the paper shreds to form a pulp, diluting said pulp to form a fiber suspension and submitting the suspension to high speed, high shear dispersion to form a pulp ready for papermaking.

18 Claims, No Drawings

METHODS OF DEINKING CELLULOSIC MATERIALS

BACKGROUND OF THE INVENTION

This invention relates to a process of deinking cellulosic materials and in particular to a process of deinking a broad spectrum of printed products including newspaper, laser written paper, xerographic paper, rotogravure, heatset, including coated and uncoated stock and high gloss multi-colored paper, such as magazines.

Conventional methods of deinking and reclaiming waste paper have involved cooking of waste stock in various aqueous deinking chemicals. Such methods were reasonably satisfactory and adequate a number of years ago when there was no need to deink and reclaim waste paper having little or no quantities of ground wood. Such papers were printed with standard inks which are more readily removed or saponified with chemicals at elevated temperatures.

In recent years, however, methods of deinking which involve cooking and the use of chemicals in aqueous media have become increasingly unsatisfactory for a number of reasons. Ink formulations have become more and more complex and involve an increasing use of a wide variety of synthetic resins and plasticizers; with each ink having its own special formulation. Also, increasing amounts of synthetic resins and plasticizers are being used in a wide variety of sizings, coatings, plastic binding adhesives, thermoplastic resins and pressure sensitive label adhesives. Furthermore, the use of multicolored printing and multicolored advertisements have become increasingly popular in recent years and these involve a wide variety of new ink formulations. Many of the new ink formulations incorporate new pigments, dyes and toners which are difficult to remove by conventional aqueous deinking chemicals. The former methods of deinking and reclaiming waste paper by chemical and cooking techniques are not adapted for, or adequate for, removing the new types of inks and coating resins. Due to high contents of thermoplastic resins, the softening action of heat and chemicals alone make their separation from the fibers very difficult. Additionally, the action of heat and chemicals tend to irreversibly set and more firmly bond some of the present day pigments to the fibers and fix dyes and toners to the fibers through staining.

For the above and other reasons, conventional deinking techniques used in reclaiming processes for waste paper are no longer efficient or effective for many current needs.

The need for a satisfactory deinking process has become increasingly important due to greatly expanded utilization of paper and difficulty in disposal of the old papers due to projected lack of landfill sites.

In this regard, to preserve natural resources and minimize environmental problems, the need for developing useful and efficient paper recycling processes becomes of critical importance.

Conventionally, cooking processes for deinking paper have utilized aqueous based suspensions. The stock to be salvaged is first thoroughly cleansed of superficial dirt and then macerated. The maceratum is boiled, subjected to cooking and defiberizing in a suitable aqueous alkali to soften the paper fibers, loosen and disintegrate at least part of the ink and other matter adhering to the fibers, and thoroughly agitated, either while in the alkaline solution or subsequently, to disintegrate and defiber the stock as thoroughly as possible. Thereafter, the pulp is riffled and screened and subsequently dewatered, preferably through suitable rolls, filters, or the like, to remove a considerable portion of the loosened ink. It is then washed and dewatered for removal of additional quantities of the loosened ink as many times as may be practical and expedient.

In general, conventional deinking agents have employed an aqueous alkali solution which may, in addition, contain one or more of the following: a nonionic detergent, a sodium soap of fatty acids or abietic acid sulfonated oil; a dispersing agent to prevent agglomeration of the pigment after release and to emulsify any unsaponifiable material; a softening agent such as kerosine or mineral oil to soften the vehicle of the inks; an agent such as clay, silicate, etc., for selective absorption of pigments after release from the fiber to prevent redeposition on the fiber; and a basic exchange chemical to prevent formation of calcium soaps.

The cooked and defibered pulp is then diluted to less than 1 percent concentration and riffled and screened to remove oversized objects and undefibered pieces of paper. This material is then washed with large amounts of water, an average of 20,000 gallons of water per ton of pulp, to separate the fiber from other substances by washing or screening or by a flotation process. The disposal of large amounts of water used in such processes pose a stream pollution problem which must be remedied.

Another area in which conventional deinking techniques are unsatisfactory in reclaiming waste paper is in the area of electrophotography, better known as xerography. In the art of xerography, an electrostatic xerography latent image is formed by uniformly charging a photoconductive insulating surface of a xerographic plate followed by exposing the charged surface to a pattern of light. The latent image formed by this technique is then developed with an electroscopic powder, also known as a toner, to form a powdered image which is then transferred to a sheet of normal bond paper. The powder image contained on the paper is then fused into the paper to form a permanent reproduction of an original image.

Another means of xerographic development is liquid electrophoretic development, which has particular utility when photoconductive paper is xerographically processed. Developers may be prepared by dispersing finely ground pigments, such as zinc oxide, phthalocyanine blue or nigrosine in an insulating hydrocarbon liquid such as toluene, carbon tetrachloride, or petroleum fractions. The pigment particles acquire electrical charges during dispersion and remain suspended in a liquid. When a photoconductive paper containing an electrostatic image of a polarity opposite to that of the dispersed particles is immersed in the liquid, the pigment particles migrate and become fixed on the latent image.

Laser writing processes also employ various complex dyes and pigments applied to paper by high temperature fusion. These processes are similar, in effect, to the xerographic processes in that ink removal is extremely difficult.

Since ever increasing amounts of xerographic and laser written paper are being used each year, effective processes for reclaiming this type of waste paper are very much needed. However, the effectiveness of any deinking process must take into account the fact that development compositions for xerographic and laser writing processes consist of complicated organic compositions fused under high heat to the paper. With regard to toner development, as heretofore indicated, the toner is usually made of fusible resins or resin blends in which a pigment, such as carbon black has been dispersed. The resins are selected to provide a melting point within the proper range for heat fixing or of a sufficient solubility for solvent vapor fixing. In essence, the action of heat and complex organic chemicals in these printing processes yield printed paper having almost irreversibly stained cellulosic fibers.

In the past, nonaqueous deinking processes have been employed that utilize various chemical additives such as surfactants. U.S. Pat. No. 3,072,521, for example, relates to a nonaqueous process of deinking cellulosic materials employing a surfactant-containing organic solvent. The surfactant is necessary to enable removal of ink from the paper.

Other deinking processes that have been developed utilize partial nonaqueous or immiscible solvents. U.S. Pat. No. 3,635,789, describes a deinking process whereby an immiscible solvent is added to an aqueous pulp suspension to facilitate the removal of ink from the pulp. U.S. Pat. No. 3,891,497, relates to a process for recovering of waste paper using steam and immiscible fluids and a small amount of water. The water is added to the waste paper to make it easier to break the bonds between the fibers. The process is conducted in a pulper at an elevated pressure because high temperatures are employed.

SUMMARY OF THE INVENTION

Thus, it is an object of the present invention to provide a deinking process with a non-aqueous solvent that does not require surfactants to enable complete ink removal.

It is another object of this invention to provide a process for deinking diverse types of waste paper that is both economical and relatively easy to perform.

It is even another object of this invention to provide a process for deinking waste paper that produces a high quality reclaimed pulp which may be adapted to the manufacture of conventional types of paper.

It is also an object of the present invention to provide a nonaqueous solvent that is economical and that is capable of fully removing ink from diverse types of paper.

It is also an object of the present invention to provide a deinking process that employs fewer chemical additives and less water that reduces the clean up costs and the negative impact on the environment.

In accordance with the present invention, a novel process for deinking waste paper is provided. The process provides a nonaqueous recycling technique that can remove ink from newspaper, rotogravure, heat set paper, including coated and uncoated stock, multicolored paper, including printed yellow directory paper, as well as xerox/laser written paper and high gloss multicolored paper, such as magazines.

It is also an objective of the present invention to eliminate "stickies" caused by solvent-based adhesives used in pressure sensitive labels and binders. When papers which include such adhesives are recycled, the adhesives tend to agglomerate. As a result, potentially severe processing problems can result. For example, during paper formation the agglomerates can deposit on the wire mesh and prevent water from draining properly through the mesh. Without proper drainage, "pin holes" will appear in the resulting paper. Also, agglomerates of adhesive in the resulting paper will provide a mechanism in which two separate sheets will adhere together when contacted in paper rolls. Adhesion between layers of a paper roll can necessitate a complete operation shutdown. As a result of these severe problems, expensive and complex systems have been developed to remove the solvent-based adhesives upon recycle. Such techniques are unnecessary with the process of the present invention.

A particular embodiment of the invention provides a multiple step deinking technique comprising, shredding or chopping cellulosic waste materials to create uniform paper shreds, immersing the paper sheets into a nonaqueous organic solvent while agitating the shreds, completely removing the solvent, bleaching the shreds to form a fiber pulp, diluting to form a suspension and submitting the suspension to high speed, high shear dispersion to separate residual pigments from the fibers before papermaking. Such a process can provide improved ink removal without the use of an abundance of water and a solvent/surfactant combination.

DESCRIPTION OF THE PREFERRED EMBODIMENTS

In accordance with the present invention, waste paper or cellulosic material to be treated is preferably subdivided in relatively small pieces by passing the waste paper through a conventional shredding machine. The exact size of the pieces is not particularly material as it is necessary to merely subdivide the waste paper to an extent effective to provide a bulky mass having uniform paper shreds.

After the paper has been shredded or chopped, it is introduced into an agitation tank containing an organic solvent in sufficient quantity to form a mixture. In practice, the process can utilize a mixture of from about 1 to about 50 percent solids content, preferably from about 2 to about 15 percent.

The selection of the particular organic solvent employed in the deinking process of the invention is extremely important. The solvent must not be retained by the cellulosic fibers and must be efficient in removing various types of ink. Toluene has been found to be the most effective solvent to solvate ink oils, resins, lacquers and other polymeric contaminants and is not retained by the fibers. Moreover, toluene is not a halogenated hydrocarbon and, therefore, does not cause stratospheric ozone depletion. A comparison with other common solvents is illustrated in Table II. Toluene clearly yields a bright recycled paper with no solvent retention.

It also should be appreciated that efficacious results are obtained when employing the solvents of the present invention without the need for surfactants, as is necessary in other deinking processes.

The temperature of the prepared mixture is not particularly critical. As such, any temperature can be employed which is technologically practical. For example, a temperature below room temperature could be used, or a temperature up to the boiling point of the solvent can be used, if pressure equipment is employed. However, the agitation is preferably performed at room temperature to reduce operating costs.

The mass in the agitation tank is circulated for a time sufficient to extract most of the ink vehicles and resins from the shredded papers. The process also removes other contaminants, such as pressure sensitive adhesives and glues through chemical solvation and surface action of the solvent. The time required for this operation will vary with the particular apparatus employed and the condition of the processed material. Preferably, the agitation is conducted for about 2 to about 40 minutes.

After completion of agitation, the paper shreds are filtered from the agitation tank and the excess liquid is separated from the paper shreds which are then washed again, if desired with additional organic solvent. The solvent separation may, for example, be advantageously accomplished by passing the paper shreds from the agitation tank directly to a continuous filter. In this type of filter, a perforated drum rotates in a tank containing the paper shreds and by the action of reduced pressure or suction, the liquid is drawn through the perforations, leaving a mat of paper shreds on the surface of the drum, through which subsequent filtering occurs. During the rotation of the drum, the mat of paper shreds on the surface thereof can be subjected to sprays of the solvents for additional washing. Heat, in addition to reduced pressure, can also be employed to completely remove the solvent from the paper shreds. Other means for solvent removal can also be employed, such as hydrocyclones.

The solvent withdrawn from the paper shreds may be reused without purification for more than 10 times. When the efficiency of ink removal becomes unacceptable, the solvent and extracted ink or resins can be used as fuel for its heat value or the solvent may be recycled by removing the contaminants from the solvent medium using any suitable means. For example, filtration, settling and decantation, distillation, etc., and combinations thereof may be employed. Thereupon, the recycled solvent may be introduced to the agitation tank for further removal of ink, plasticizers and resins. The reuse of the solvent may be carried out batchwise or continuously depending on whether the deinking process is continuous.

Following the initial solvent filtration, the paper may again be washed with solvent. This step may be conducted several times if desired.

After solvent washing and drying, the paper shreds are baled and stored or are conveyed to a bleaching tank where aqueous bleaching agents are subsequently added. Preferably, an aqueous solution of 5 percent sodium silicate, 1 percent sodium hydroxide and 3 percent hydrogen peroxide is employed. It is desirable to bleach, under alkaline conditions, with a pH in the range of about 9.0 to about 12 and at a temperature in the range of about 20 to about 90° C. The temperature of the bleaching tank is raised to the desired operating temperature by means of inductive heating, or preferably by means of steam injection. These conditions increase the effectiveness of the bleaching chemicals and decrease the bleaching tank holding time to achieve a given degree of pulp brightness.

The bleaching time may vary depending on the bleaching tank temperature or the amounts of bleaching agents utilized. The pulp should be bleached from about 5 to about 20 minutes, and preferably from about 8 to about 12 minutes.

A mixer is provided in the bleaching tank to disperse the bleaching chemicals, converting the paper shreds into a fiber pulp, and to expose most of the surface areas of the pulp to an adequate amount of bleach. During the process, sufficient bleaching solution should be added to provide a fiber to liquid concentration varying from about 5 to about 40 percent, and preferably from about 10 to about 30 percent.

Following the bleaching step, the bleaching solution is drained and the pulp is removed from the bleaching tank and placed in a dispersion or defiberization tank. Water is added to the fiber pulp in a quantity sufficient to form from about 0.2 to about 2.0 percent concentration of fiber in water, and more preferably about 0.5 percent.

In the dispersion process, the pulp is subjected to a high speed, high shear environment in a suitable defiberizing apparatus, such as a hollander beater. The defiberizing apparatus can be any suitable mechanical device having blades rotating axially at high speeds to produce high shear on the waste paper. Rotating speeds range from about 10,000 to about 20,000 RPM, and preferably from about 14,000 to about 18,000 RPM. The dispersion process is conducted from about 1 to about 10 minutes and more preferably from about 2 to about 5 minutes. The high speed, high sheer action loosens and separates ink pigments lodged in the fibrillar surface of the fibers. The loose pigments are removed by high vacuum filtration or by other similar processes.

After the dispersion process, the fiber can be conveyed to a storage chest for use in the manufacture of paper or it is suspended in water and pumped to a dewatering device, such as a lap pulp machine, a belt press or other device that removes water from pulp without damaging the integrity of the pulp fibers.

In summary, the present invention possesses numerous advantages over prior art deinking processes. In particular, the agitation process according to the present invention utilizes a nonaqueous solvent that is inexpensive, readily available and can be recycled, and does not require any surfactants. The stream pollution and clean up costs are reduced. Moreover, the process can be carried out at room temperature in a short period of time which reduces production costs considerably.

Additionally, the nonaqueous solvent of the present invention, namely toluene, has provided unexpected beneficial ink removing results not obtainable by other nonaqueous solvents. More specifically, toluene has been found to provide brighter recycled paper from a diverse spectrum of waste paper.

The versatility of using toluene as the solvent in a deinking process according to the present invention can be seen from Table I below:

TABLE I

| TOLUENE DEINKING PROCESS IN DIFFERENT PAPER GRADES | | |
|---|---|---|
| Paper Grade | Brightness Before | Brightness After |
| Virgin Newsprint | — | 56.0 |
| ONP | 37.89 | 51.76 |
| Heatset Mag. Stock | 53.83 | 61.46 |
| Yellow Phone Directory | 30.87 | 51.21 |
| Gravure | 37.76 | 52.49 |
| Xerography | 74.39 | 74.12 |
| Laser Printed Paper | 65.0 | 71.86 |

As can be seen, the process improve the brightness of a wide spectrum of waste paper stock considerably.

To more clearly illustrate these results and the effect of using toluene according to the invention, various other nonaqueous solvents were employed in the process of the present invention. Each of these solvents, namely cyclohexane, N,N-dimethylformamide, isobutylalcohol, morpholine, 1-methyl-2-pyrolidinone, ethyl ether, ethylene glycol, acetone, hexanol, kerosine and piperazine yielded pulp having lower brightness than that produced by toluene and/or retained significant amounts of solvent. For example, recycled pulp obtained from the use of 1-methy-2-pyrolidinone and kerosine as the solvent possessed a brightness of 54.88 which represents the most advantageous results of the above mentioned solvents. Note, however, that the fibers retain solvent which renders the solvent unsatisfactory for deinking purposes. Toluene yields a brightness of 53.55 while not retaining any solvent after the process as shown in Table II.

TABLE II

SUMMARY OF SOLVENTS TESTED ON OLD NEWSPAPERS

| DESCRIPTION | BRIGHT-NESS | WHITE-NESS | COMMENTS |
| --- | --- | --- | --- |
| 20% 1-Methyl-2-pyrolidinone (MPNE)/ 80% Kerosine, 1.5% consistency | 54.88 | 82.97 | Fibers retain solvent |
| 20% N,N-Dimethylformamide/80% kerosine, 1.5% consistency | 38.33 | 69.93 | Fibers retain solvent |
| 50% Ethylene glycol (EG)/50% Kerosine | 39.62 | 71.62 | Fibers retain solvent |
| 20% MPNE/20% EG, 3% consistency | 46.94 | 76.74 | Fibers retain solvent |
| 20% Hexanol/20% MPNE/60% Kerosine | 52.24 | 81.49 | Fibers retain solvent |
| 100% Cyclohexane, stir 10 minutes at 10% consistency | 51.24 | 79.78 | Handsheet deinked and dry |
| Morpholine 100% | 48.08 | 80.76 | Fibers retain solvent |
| Cyclohexanone | 47.19 | 76.91 | Fibers retain solvent |
| N,N-Dimethylformamide | 52.32 | 81.05 | Handsheet deinked and dry |
| 20% MPNE/20% EG/ 60% Kerosine | 46.98 | 77.32 | Fibers retain solvent |
| 20% MPNE/20% Kerosine/40% EG/ 20% N,N-Dimethylformamide | 51.15 | 79.92 | Fibers retain solvent |
| Cyclohexane | 52.11 | 80.63 | Clean handsheet |
| Piperazine/Acetone | 39.40 | 71.94 | Fibers retain solvent |
| Toluene | 53.55 | 81.79 | Clean handsheet |

Other solvents that provide clean handsheets with somewhat advantageous results are also unsuitable as solvents in the process of the present invention. For example, N,N-dimethylformamide and cyclohexane yield relatively high brightness but are more volatile and flammable at ambient temperatures, are more difficult to distill from water, are more expensive on an industrial scale and are not as an effective solvent for lacquers, gums, oils, resins and coatings. Moreover, N,N-dimethylformamde is miscible in water.

Although waste paper has been used to illustrate the present invention, any imprinted cellulosic material can be recycled for reuse by the process of the present invention; for example, various kinds of imprinted paper, such as imprinted newsprint, rotogravure print, bookstock, heatset, including coated and uncoated stock, yellow directory paper, xerography or laser printer stock, magazine stock, ledger stock, cardboard, etc. In addition, the process may be used to dewax or remove plasticizers or resins from any cellulose stock.

The aforementioned process of the present invention is particularly effective for deinking a mixed stream of cellulosic starting materials. However, if the cellulosic starting material is from a particular single source, free of contaminants, it may not always be necessary to immerse the paper shreds into a non-aqueous organic solvent.

For example, an acceptable deinking may be obtained when either newspaper or multi-colored paper printed with aqueous-based ink is used as the sole source for the starting material. That is, if either is the sole source of cellulosic material, the solvent immersion step may not be necessary. On the other hand, papers printed by rotogravure and heat-set lithography do require solvent treatment for an acceptable deinked product. In all cases, however, better products will be obtained using the solvent immersion step.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent processes.

We claim:

1. A method of deinking cellulosic materials comprising:
    i) immersing said cellulosic materials into a non-aqueous organic solvent, while agitating said cellulosic materials, said non-aqueous organic solvent selected from those effective for removing ink but not retainable by the cellulosic fibers;
    ii) thereafter removing said organic solvent;
    iii) thereafter bleaching said cellulosic materials and forming a fiber suspension;
    iv) thereafter separating residual ink pigments from the fibers by submitting said fiber suspension to high speed, high shear to an extent effective to dislodge the ink pigments from the fibers; and
    v) removing the ink pigments from the suspension of step iv.

2. A method of deinking cellulosic materials according to claim 1, wherein the nonaqueous organic solvent is toluene.

3. A method according to claim 2, wherein the solvent consists essentially of toluene.

4. A method of deinking cellulosic materials according to claim 1, wherein said cellulosic materials comprise printed paper in which a solvent is the vehicle used to apply ink to the paper.

5. A method of deinking cellulosic materials according to claim 4, wherein said paper is a newspaper.

6. A method of deinking cellulose material according to claim 4, wherein said paper is printed by rotogravure.

7. A method of deinking cellulosic material according to claim 4, wherein said paper is printed by heat-set lithography.

8. A method of deinking cellulosic material according to claim 4, wherein said paper is a multi-colored paper.

9. A method of deinking cellulosic materials according to claim 1, wherein said cellulosic materials are shredded or chopped using a mechanical shredder.

10. A method of deinking cellulosic materials according to claim 1, wherein said cellulosic materials are immersed in the organic solvent for about 2 to about 40 minutes.

11. A method of deinking cellulosic materials according to claim 1, wherein said organic solvent is separated from said cellulosic materials and recycled by distillation to be reused in the deinking process.

12. A method of deinking cellulosic materials according to claim 1, wherein more than one bleaching agent is employed in said bleaching step.

13. A method of deinking cellulosic materials according to claim 10, wherein said bleaching agents are sodium hydroxide, sodium silicate and hydrogen peroxide.

14. A method of deinking cellulosic materials according to claim 9, wherein said high speed high shear is performed from about 1 to about 10 minutes.

15. A method of deinking cellulosic materials according to claim 1, wherein said cellulosic materials are immersed in the absence of a surfactant.

16. A method according to claim 15, wherein the solvent consists essentially of toluene.

17. A method for deinking cellulosic materials according to claim 1, wherein said cellulosic materials are shredded or chopped form paper shreds before being immersed and agitated in said non-organic solvent.

18. A method for deinking cellulosic materials according to claim 1, wherein said cellulosic materials comprise laser written paper to which ink has been applied by using heat transfer.

* * * * *